United States Patent
Frey, Jr.

(10) Patent No.: US 9,778,365 B2
(45) Date of Patent: Oct. 3, 2017

(54) SINGLE RECEIVER GPS POINTING VECTOR SENSING

(75) Inventor: Robert D. Frey, Jr., Bolton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 798 days.

(21) Appl. No.: 13/883,376

(22) PCT Filed: Aug. 16, 2012

(86) PCT No.: PCT/US2012/051056
§ 371 (c)(1),
(2), (4) Date: May 3, 2013

(87) PCT Pub. No.: WO2013/028443
PCT Pub. Date: Feb. 28, 2013

(65) Prior Publication Data
US 2013/0328718 A1    Dec. 12, 2013

Related U.S. Application Data

(60) Provisional application No. 61/527,159, filed on Aug. 25, 2011.

(51) Int. Cl.
*G01S 19/47* (2010.01)
*G01S 19/05* (2010.01)
*G01S 19/54* (2010.01)
*G01S 19/22* (2010.01)

(52) U.S. Cl.
CPC .............. *G01S 19/05* (2013.01); *G01S 19/22* (2013.01); *G01S 19/54* (2013.01)

(58) Field of Classification Search
CPC ........... G01S 19/05; G01S 19/22; G01S 19/54
USPC ................. 342/357.03; 17/357.03; 16/357.03
See application file for complete search history.

(56) References Cited

U.S. PATENT DOCUMENTS

| | | |
|---|---|---|
| 5,185,610 A | 2/1993 | Ward et al. |
| 5,266,958 A | 11/1993 | Durboraw, III |
| 5,347,284 A | 9/1994 | Volpi et al. |
| 5,952,968 A | 9/1999 | McDowell |
| 6,281,841 B1 | 8/2001 | Nevill |
| 6,441,779 B1 | 8/2002 | Bennett et al. |
| 6,615,135 B2 * | 9/2003 | Davies .................. G01C 21/30 342/357.31 |
| 2005/0043887 A1 | 2/2005 | Chenus et al. |

OTHER PUBLICATIONS

PCT/US12/051056, Extended European Search Report mailed Jul. 8, 2015.

* cited by examiner

*Primary Examiner* — Frank J McGue
(74) *Attorney, Agent, or Firm* — Maine Cernota & Rardin (57) ABSTRACT

A system and method of determining a pointing vector using two GPS antennas and a single GPS receiver is disclosed. Two stationary GPS antennas, with a separation preferably less than half of a wavelength (~100 mm) may use a single receiver to determine the pointing vector of the system. Incorporation of a three axis angular rate measurement allows pointing determination during system rotation. Incorporation of three axis gyroscope system allows pointing determination while in motion. The system provides the ability to sense multipath and jamming. Also the system can potentially eliminate the impact and certainly alert the user that the measurement may not be reliable.

15 Claims, 7 Drawing Sheets

SINGLE RECEIVER GPS POINTING VECTOR SENSING

CROSS-REFERENCE TO RELATED APPLICATIONS

This Application claims rights under 35 USC §119(e) from U.S. Application Ser. No. 61/527,159 filed Aug. 25, 2011, the contents of which are incorporated herein by reference.

TECHNICAL FIELD

Embodiments are generally related to direction finding systems. Embodiments are also related to a method and system for determining north in target locator systems. Embodiments are additionally related to a single receiver GPS pointing vector sensing system.

BACKGROUND OF THE INVENTION

GPS (Global Positioning System) navigation systems include a constellation of satellites each of which provides a coded signal which may be picked up by radio receivers on the surface of the earth. Separate coded signals from a set of satellites may be processed by a receiver system for use in determining location as defined by latitude, and longitude based on the code carried by the signals. The operation of GPS systems in determining location based on coded signals received from satellites reflects the conventional functioning of such systems.

However, it has been found that the signals generated by GPS satellites may be used in other ways and in particular the carrier phase of the signals may be used in certain surveying applications. For example, a pair of stationary antenna/receiver combinations may be located at the ends of a baseline (whose length is required to be determined) and, based on the observed relative phase of the GPS carrier signal from satellites at known positions, determine the orientation of the antenna pair relative to an earth reference.

Current GPS orientation techniques require two position measurements either accomplished using two antennas and two receivers as typical in surveying applications or requiring precise movement of a single antenna/receiver pair to two different relative positions. These approaches typically require significant separation (>1 meter) between measurements in order to mitigate position inaccuracy between measurements making for large, bulky equipment.

Digital magnetic compasses are currently used in hand-held target systems to determine orientation relative to north. These devices may be easily influenced by local fields due to geological formations, metal vehicles and even equipment worn by the user. There is generally no indication when these devices are compromised leading to incorrect targeting solutions. GPS solutions are generally discounted as they can be influenced by multipath effects or jamming.

A need therefore exists for compact GPS, non-magnetic sensing of azimuth direction for target systems.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for direction finding systems.

It is another aspect of the disclosed embodiments to a method and system for determining north in target locator systems.

It is yet another aspect of the disclosed embodiments to provide for a single receiver GPS pointing vector sensing system.

It is another aspect of the present invention to provide a GPS system for determining north in a target locator system with two antennas includes two stationary GPS antennas separated by less than half a wavelength. A single receiver is also included, and is used to determine the pointing vector of the system.

It is yet another aspect of the disclosed embodiments to provide a GPS system in which the outputs of two antennas are scaled with time varying gains and summed in order to generate a carrier phase modulation that is dependent on satellite orientation.

It is yet another aspect of the disclosed embodiments to provide a GPS system that includes a three axis gyroscope that allows determination of the pointing vector while in motion.

The aforementioned aspects and other objectives and advantages can now be achieved as described herein. A system and method of determining a pointing vector using two GPS antennas and a single GPS receiver is disclosed. Two stationary GPS antennas, with a separation preferably less than half of a wavelength (~100 mm) may use a single receiver to determine the pointing vector of the system. Incorporation of a three axis angular rate measurement allows pointing determination during system rotation. The present invention provides the ability to sense multipath and jamming, potentially alerting the user that the measurement may not be reliable.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
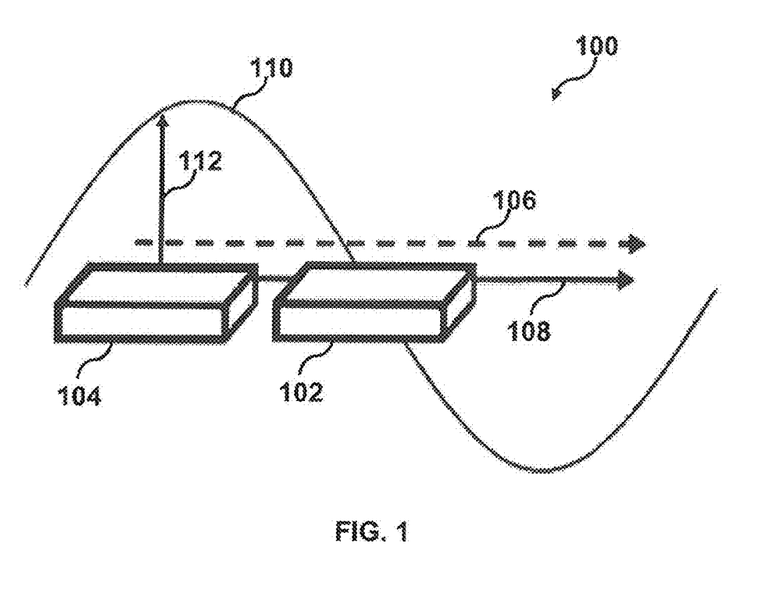
FIG. 1 illustrates a schematic diagram of a GPS system showing an orientation of two antennas with respect to a satellite, in accordance with the disclose embodiments.

Referring to FIG. 1, a schematic diagram of a GPS system 100 showing an orientation of first and second antennas 102 and 104 with respect to a satellite. The orientation can be for example, the satellite and the first and second antennas 102 and 104 are in same plane. The transmission direction 106 of the satellite is indicated with the dotted arrow. The first antenna 102 and second antenna 104 have their phase centers 108 aligned to the vector indicated with the solid arrow. The carrier signal 110 is illustrated by the sine wave. The carrier signal 110 has a phase of zero at the first antenna 102.

The phase at the second antenna 104 can also be calculated. The GPS carrier frequency is nominally 1.57542 GHz corresponding to with a wavelength of 190.3 millimeters. If the first and second antennas 102 and 104 are separated by fifty four millimeters, the phase 112 on the carrier wave 110 on the second antenna 104 relative to the first antenna 102 is calculated as −380*54/190.3=−102 degrees The Doppler shift in carrier frequency caused by the motion of the satellite has an insignificant impact on this phase difference.

Figure 2:
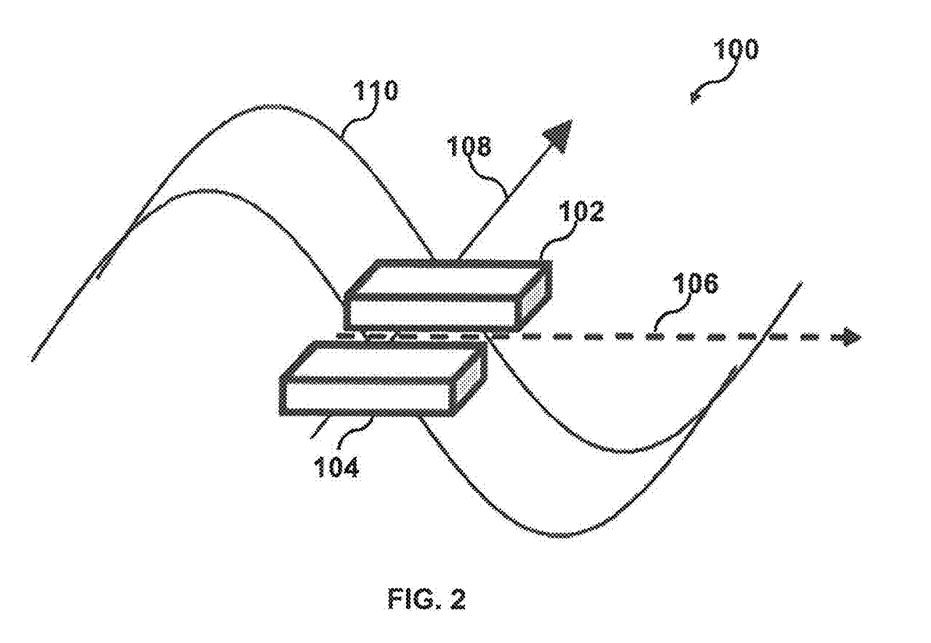
FIG. 2 illustrates a schematic diagram of the system depicted in FIG. 1 with the antenna configuration rotated 90 degrees relative to the satellite, in accordance with the disclosed embodiments.

Referring to FIG. 2 the antenna configuration of FIG. 1 is rotated ninety degrees relative to the satellite. The first and second antennas 102 and 104 receive the same, carrier phase resulting in a zero degree phase difference. This illustrates the dependency on phase difference with orientation on the horizontal plane.

Extending this relationship to three dimensions, the phase difference observed between the two antennas for each of the satellites in degrees for this example can be determined as Phase difference=102*cos θ, where θ is the angle between the vector defined by the phase centers 108 and the vector pointing to the transmission direction 106 of the satellite.

The angle between the two unit vectors can be determined using the following relationship:

$$\cos(\theta_n) = Z_n \cdot Z_b = x_b x_n + y_b y_n + z_b z_n \quad \text{Equation (1)}$$

where $Z_n$ is the unit vector pointing to the nth satellite and $Z_b$ is the unknown unit vector connecting the two antenna phase centers in the coordinate system defined for $Z_n$. $\theta_n$ is the angle between these vectors for the nth satellite.

From FIGS. 1 and 2, the measured carrier phase delta between the two antennas can be expressed as:

$$\alpha_n(t)\beta \cos(\theta_n) = \beta(x_b x_n(t) + y_b y_n(t) + z_b z_n(t)) + n_n(t) \quad \text{Equation (2)}$$

where β is the maximum phase difference determined by the antenna separation of hundred and two degrees.

The vector to the satellite defined by $x_n$, $y_n$, $Z_n$ are indicated as time varying as the satellites are in motion. There is an additive noise term $n_n$ that represents the noise on the carrier phase measurement from the GPS receiver.

Note that there are three unknowns in the equation (2), xb, yb and zb. In a noise free measurement, these values may be determined from three satellite measurements to satisfy the three equations, three unknown criteria for the unique solution. In the presence of noise, the three unknowns can be solved by taking many measurements, either using more than three satellites or using many measurements through time. The GPS position solution requires a minimum of four satellites and generally, more than four satellites are available adding more measurements to the least squares fit. The problem is amenable to recursive least square solution for a static system or may be incorporated into a Kalman estimator for a dynamic system with the addition of inertial sensors to predict rotation of the $x_b$, $y_b$ and $z_b$ vector components.

The state equations used for such an estimator can be constructed from the previous equation as $$\begin{bmatrix} \alpha_{m1} \\ \alpha_{m2} \\ \vdots \\ \alpha_{mn} \end{bmatrix} = \beta \begin{bmatrix} x_1 & y_1 & z_1 \\ x_2 & y_2 & z_2 \\ \vdots & \vdots & \vdots \\ x_n & y_n & z_n \end{bmatrix} \begin{bmatrix} x_b \\ y_b \\ z_b \end{bmatrix} \quad \text{Equation (3)}$$

where the measurement is $\alpha_{m1} = \alpha_1 + n_1$

One embodiment of this disclosure is the method used to sense the satellite dependent carrier phase shift at the two receiving antennas using a single receiver. In this embodiment, the antenna outputs are scaled by time varying gains and summed in order to generate a carrier phase modulation that is dependent on satellite orientation.

Figure 3:
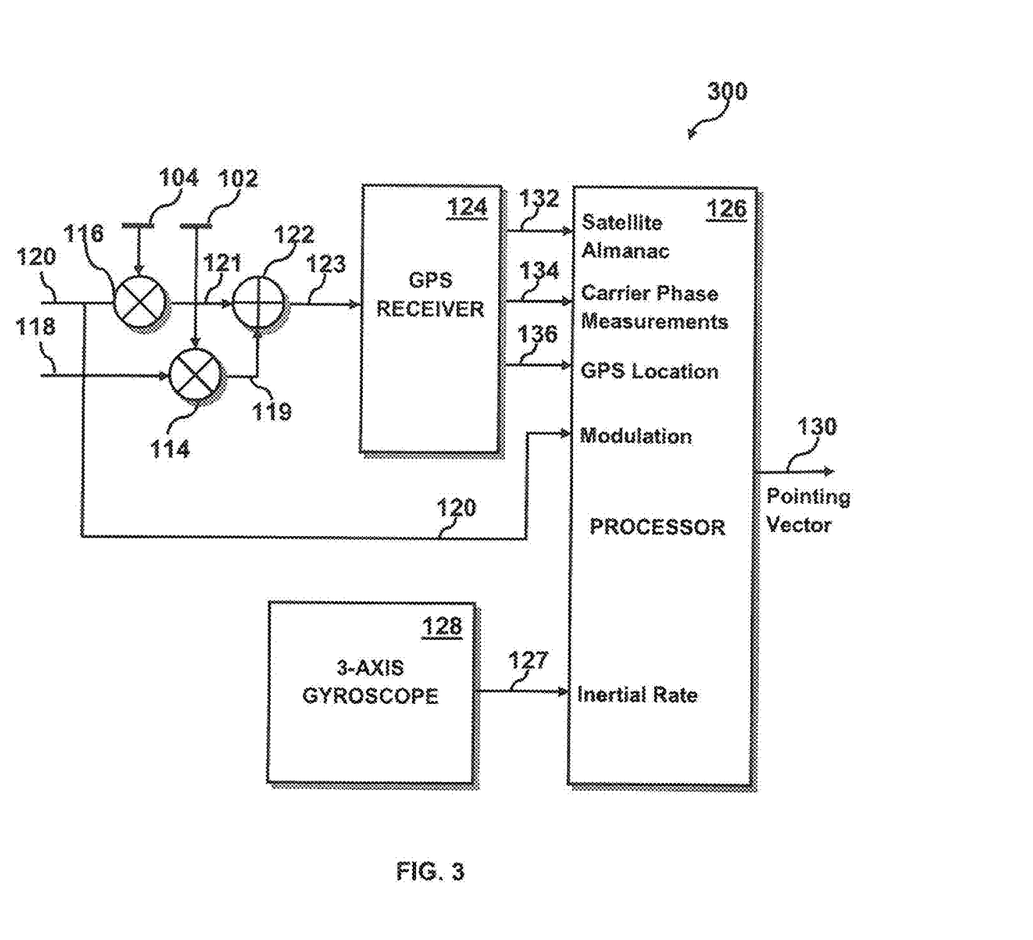
FIG. 3 illustrates a block diagram an of first antenna being scaled by a sinusoidal waveform, in accordance with the disclosed embodiments.

Referring to FIG. 3, the first antenna 102 being scaled by a sinusoidal waveform 118 with a minimum amplitude of zero and peak amplitude of one is shown by utilizing a scaler 114, typically implemented with a variable gain amplifier or variable attenuator. The apparatus 300 can be utilized for determining a pointing vector 130. The second antenna 104 is scaled by another sinusoidal waveform 120 with identical frequency but one eighty degrees out of phase by utilizing another scaler 116. The scaled antenna outputs 121 and 119 are summed and fed into a GPS receiver 124 antenna input by utilizing a summer 122. While scaling with a sinusoid over a range of zero to one is used in this example, other waveforms and amplitudes may be used to the same effect. The sinusoid offers the greatest amplitude swing with the smallest resultant jerk, minimizing potential issues in receiver carrier tracking loop.

The GPS receiver 124 processes the summed antenna signal 123 using standard GPS receiver software to generate a satellite almanac 132 that allows prediction of satellite position, provide raw carrier phase measurements 134 and determine the GPS receiver location 136. These standard data outputs are input to a processor 126 along with the measured modulation 120 and the measured inertial rotation rates 127 provided by the inertial measurement system for example three axis gyroscope 128. The raw carrier phase measurements include a measure of the phase modulation induced by the time varying summation of the two antenna signals. The processor 126 determines the pointing vector 130 based on the signals from GPS receiver 124 and three axis gyroscope 128.

The carrier signals measured from first and second antennas 102 and 104 are scaled and expressed as in equations (4) and (5), the variable a representing the gain, which varies from 0.0 to 1.0 in sinusoidal manner, applied to first antenna 102 output. In these equations, the maximum phase shift between these antennas, β, is relative to first antenna 102.

$$s_{1n} = \alpha \sin(\omega_c t) \quad \text{Equation (4)}$$

$$s_{2n} = (1-\alpha)\sin(\omega_c t + \gamma) \quad \text{Equation (5)}$$

$$\gamma = \beta \cos(\theta_n) \quad \text{Equation (6)}$$

The second antenna output can be equivalently expressed as:

$$s_{2n} = (1-\alpha)\cos(\gamma)\sin(\omega_c t) + (1-\alpha)\sin(\gamma)\cos(\omega_c t) \quad \text{Equation (7)}$$

The sum of the two weighted antenna outputs $$a_n = s_{1n} + s_{2n} = a\sin(\omega_c t) + b\cos(\omega_c t) \quad \text{Equation (8)}$$

$$a = \alpha + (1-\alpha)\cos(\beta \cos(\theta_n)) \quad \text{Equation (9)}$$

$$b = (1-\alpha)\sin(\beta \cos(\theta_n)) \quad \text{Equation (10)}$$

$$a_n = \sqrt{(a^2+b^2)}\sin(\omega_c t + a\tan(b/a)) \quad \text{Equation (11)}$$

Figure 4:
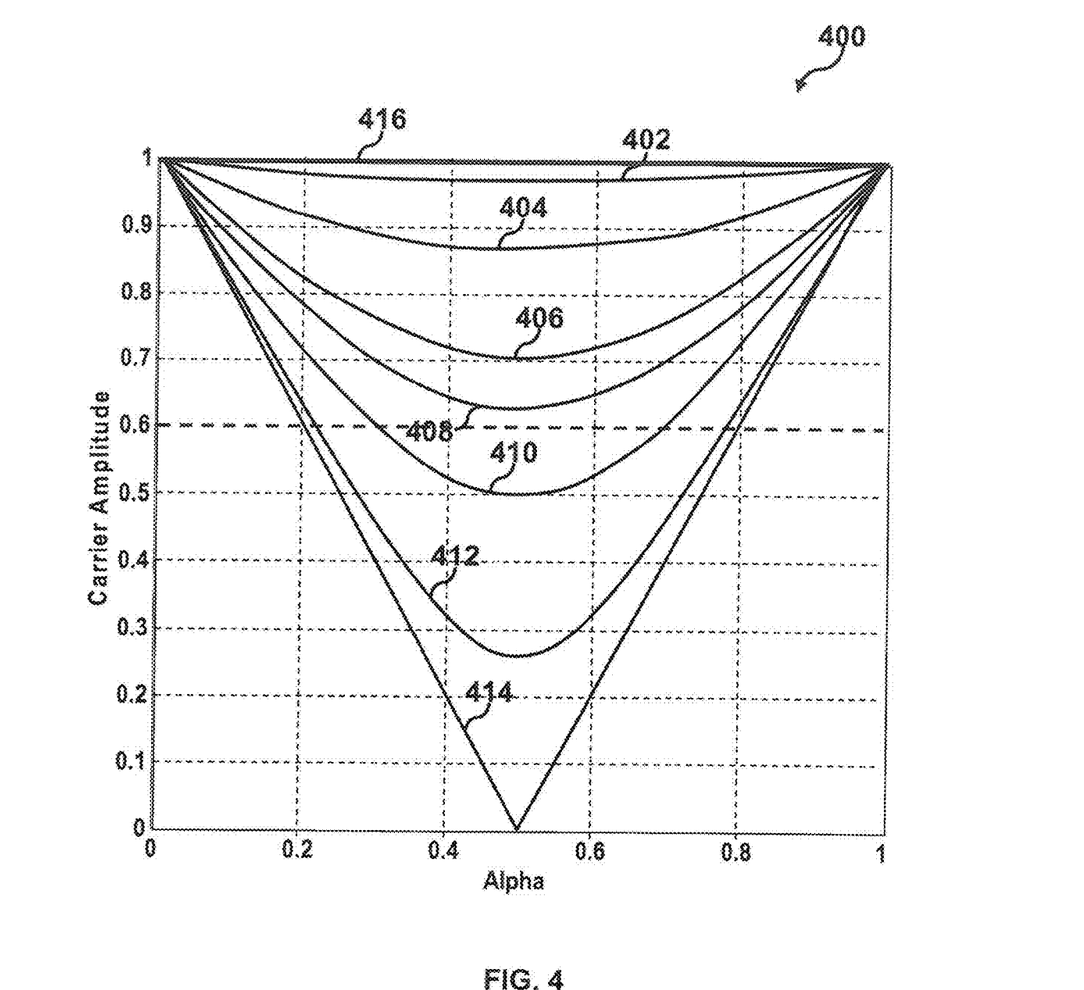
FIG. 4 illustrates a graph of carrier amplitude relative to antenna output as a function of alpha, in accordance with the disclosed embodiments.
Figure 5:
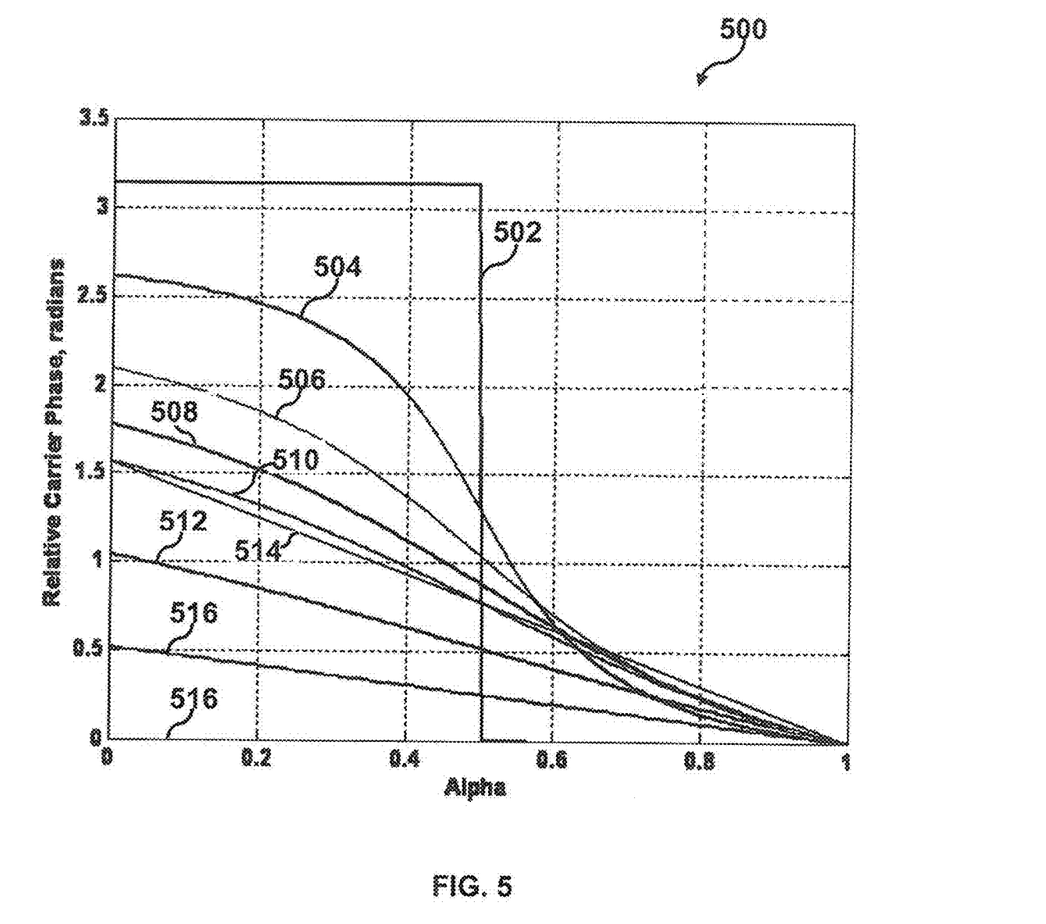
FIG. 5 illustrates a graph of carrier phase relative to antenna output as a function of alpha, in accordance with the disclosed embodiments.

FIG. 4 illustrate a graph 400 showing the variation of the carrier amplitude as a function of alpha parametric with gamma, while FIG. 5 illustrate a graph 500 showing the variation of carrier phase as a function of alpha parametric with gamma. The operating point selected for the example was a maximum phase delta of 102 degree (1.78 radians), resulting in a periodic amplitude loss on the carrier varying from 1.0× to 0.62×. The optimum operating point is a trade between maximizing the resultant phase modulation versus the impact of the amplitude modulation on the ability of the receiver to track lower signal levels. It may also be desirable to use lower gammas (smaller antenna separation) so that the phase response shown in FIG. 5 stays somewhat linear in order to preserve the sinusoidal modulation shape. The selected gamma of 1.78 radians has a slight non-linearity in phase response as it varies from 0 to 1.78 radians.

The variation of carrier amplitude as a function of alpha parametric with gamma depicted as 416, 402, 404, 406, 408, 410, 412 and 414 for relative carrier phase delta values 0, 0.5236, 1.0472, 1.5708, 1.78, 2.0944, 2.618 and 3.1416 radians respectively are shown in FIG. 4. Also the variation of carrier phase as a function of alpha parametric with gamma depicted as 502, 504, 506, 508, 510, 512 514 and 516 for relative carrier phase delta values 0, 0.5236, 1.0472, 1.5708, 1.78, 2.0944, 2.618 and 3.1416 radians respectively are shown in FIG. 5.

Figure 6:
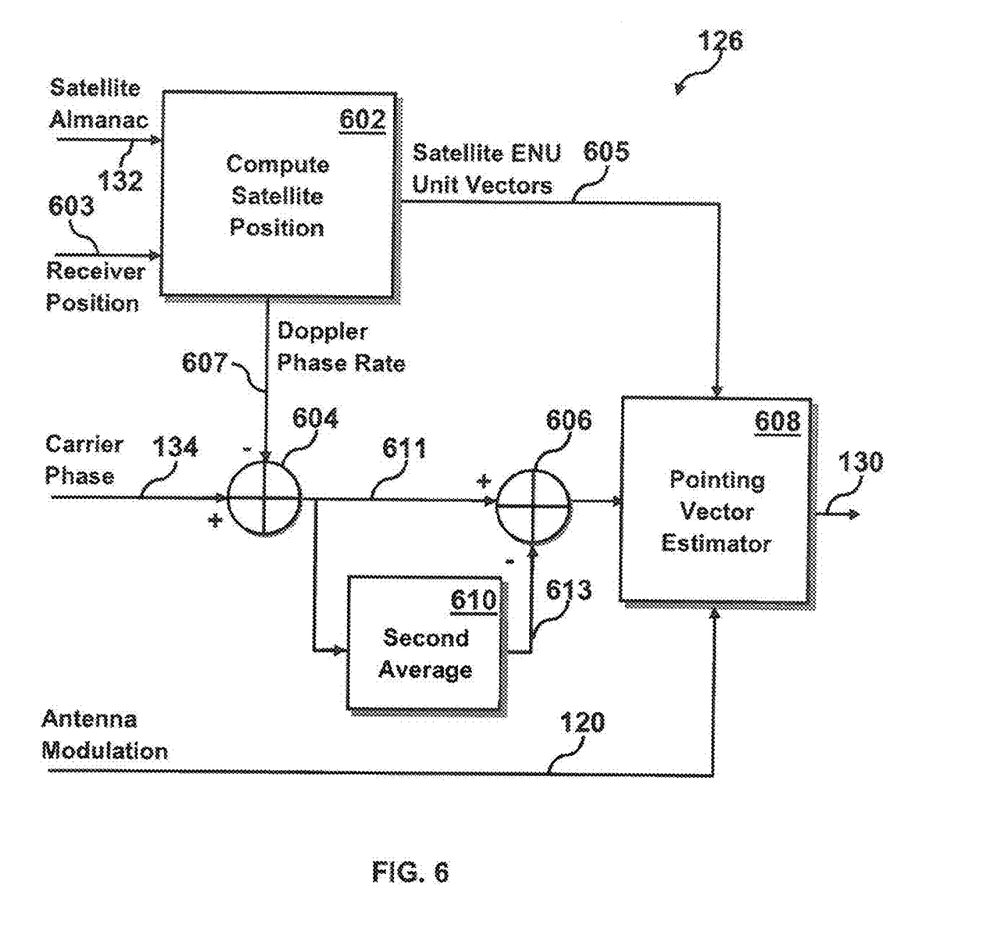
FIG. 6 illustrates a block diagram of the processor depicted in FIG. 3 utilized for determining a pointing vector directly from measurements of a carrier phase, in accordance with the disclosed embodiments.
Figure 7:
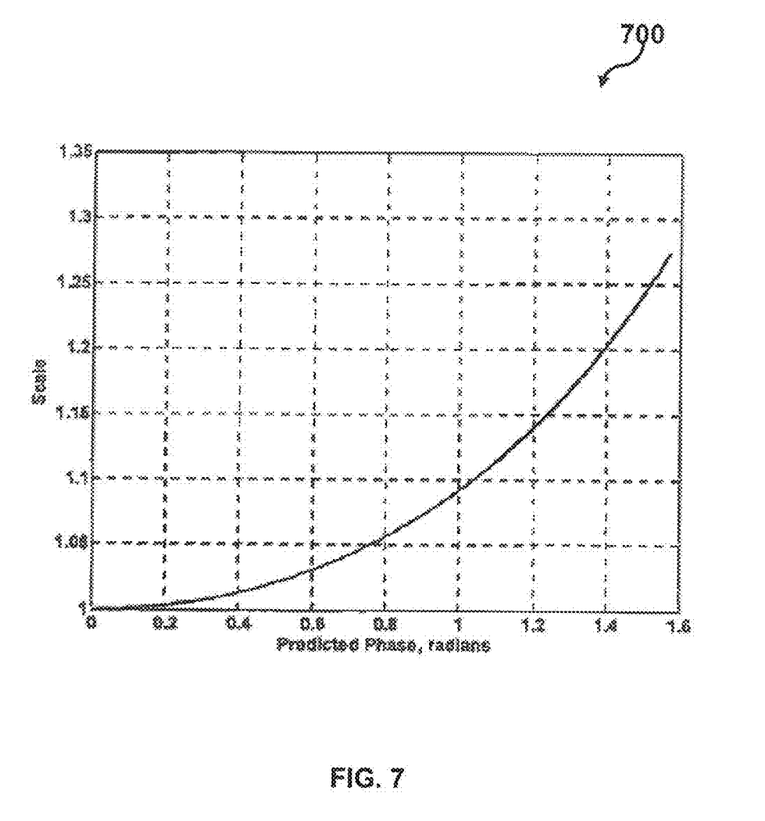
FIG. 7 illustrates a graph of the scale from predicted amplitude to measured amplitude, in accordance with the disclosed embodiments.

Referring to FIG. 6, a block diagram of the processor 126 depicted in FIG. 3, utilized for determining the pointing vector 130 directly from a carrier phase measurement 134 is shown. The satellite almanac 132 and receiver position 603 are given as input to the compute satellite position module 602. The compute satellite position module 602 determines the time varying range to each satellite and the time varying unit vectors pointing to each satellite in the local East-North-Up (ENU) reference frame. The range is expressed in terms of phase based on the wavelength and represented as Doppler phase rate 607. The time varying unit vectors are represented as satellite ENU unit vectors 605. The carrier phase measurement 134 is subtracted from the Doppler phase rate 607 by utilizing a subtrator 604. The resultant phase measurement 611 includes a residual phase rate and low frequency phase variation as well as the desired phase modulation. A rolling average equal to the period of the carrier phase modulation is computed and subtracted from the phase measurement in order to remove the residual phase errors and preserve phase modulation information. For the case when a one Hertz modulation signal is used, a rolling one second average signal 613 obtained from a one second average module 610, is subtracted from the resultant phase measurement 611 by utilizing a subtrator 606. This eliminates low frequency variation and converts any residual phase rate into a constant offset. The antenna modulation signal 120 is given as input to a pointing vector estimator 608. The pointing vector estimator 608 may be a Kalman estimator. The gyroscope input is integrated to create a Direction Cosine Matrix (DCM) corresponding to the rotation of the system since the previous estimator iteration. This is used by the estimator to predict the pointing vector 130 for the next estimator iteration.

A Kalman estimator is provided here as the preferred implementation for the pointing vector estimator 608, other estimator implementations are possible. The state for the estimator is defined as:

$$\hat{X}_k = \begin{bmatrix} x_b k \\ y_b(k) \\ z_b(k) \end{bmatrix} \quad \text{Equation (12)}$$

where $x_b$, $y_b$ and $z_b$ is the pointing vector of the system. The state prediction for the next update is given by $$\hat{X}_{k,k-1} = F\hat{X}_{k-1} \quad \text{Equation (13)}$$

where F is a DCM calculated representing system motion relative to the previous estimator iteration.

Earth referenced unit vectors for satellites 1 through n are calculated from the satellite almanac 132 provided by the GPS receiver 124:

$$U = \begin{bmatrix} x_1 & y_1 & z_1 \\ x_2 & y_2 & z_2 \\ \vdots & \vdots & \vdots \\ x_n & y_n & z_n \end{bmatrix} \quad \text{Equation (14)}$$

For a 1 Hz phase modulation, the gain on antenna 1, $\alpha$, is defined as $$\alpha_k = 0.5\sin(2\pi t_k) + 0.5 \quad \text{Equation (15)}$$

The measurement prediction is the predicted carrier phase in expressed in meters as determined by:

$$\hat{\gamma}_k = \beta * U * \hat{X}_{k,k-1} \quad \text{Equation (16)}$$

$$a = \alpha_k + (1-\alpha_k)\cos(\hat{\gamma}_k) \quad \text{Equation (17)}$$

$$b = -(1-\alpha_k)\sin(\hat{\gamma}_k) \quad \text{Equation (18)}$$

$$\hat{\theta}_{k,k-1} = \frac{\lambda\left[\operatorname{atan}\left(\frac{b}{a}\right) + \frac{\hat{\gamma}_k}{2}\right]}{2\pi} \quad \text{Equation (19)}$$

where $\lambda$ is the carrier wavelength, $\alpha$ is the modulation used for the antenna gain and $\beta$ is determined by the antenna separation. $\gamma_k$ and $\theta_{k,k-1}$, a and b are n×1 vectors. The a tan arguments are evaluated element by element rather than as a matrix divide.

The linearized measurement prediction is determined from:

$$\hat{\theta}'_{k,k-1} = H\hat{X}_{k,k-1} \quad \text{Equation (20)}$$

$$H = dU(\alpha_k - 0.5) \quad \text{Equation (21)}$$

where d is the distance between centers of the two antennas. The kalman estimator then uses the standard set of equations:

$$P_{k,k-1} = F_k P_{k-1} + Q \quad \text{Equation (22)}$$

where Q is zero for stationary operation. For dynamic operation, Q must be set based con the rotational motion anticipated.

$$y_k = \theta_m - \bar{\theta}_{k,k-1} \quad \text{Equation (23)}$$

$$S_k = H_k P_{k,k-1} H_k^T + R \quad \text{Equation (24)}$$

R is a diagonal matrix with the values in the diagonal set to the set to the variance of the carrier phase noise, high pass filtered with a 1 Hz cutoff frequency.

$$K_k = P_{k,k-1} H_k^T S_k^{-1} \quad \text{Equation (25)}$$

$$\hat{X}_k = \hat{X}_{k,k-1} + K_k y_k \quad \text{Equation (26)}$$

$$P_k = (I - K_k H_k) P_{k,k-1} \quad \text{Equation (27)}$$

The magnitude of the predicted carrier phase modulation and the measured carrier phase modulation ideally match at steady state. The magnitude of the difference between measurement and prediction can be used as a measure of the accuracy of the solution. Satellite signals with significant difference between prediction and measurement are likely impacted by multipath or jamming signals and can be selectively dropped from the solution until a minimum accuracy as determined by the remaining difference has been achieved.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for determining the pointing direction of a system relative to an earth reference comprising:
   at least two stationary GPS antennas configured to receive multiple satellite transmissions, wherein said antennas are separated from each other by a distance less than half a wavelength;
   a summer whereby outputs of said at least two antennas are summed; and
   a single GPS receiver having a pointing vector estimator and being configured to receive the summed output of said at least two GPS antennas to determine a pointing vector of said system from outputs of said antennas;
   said pointing vector estimator being configured to derive an optimum solution for pointing vector from said summed output of said at least two GPS antennas and known satellite geometries,
   wherein said outputs of said antennas are scaled by first and second sinusoidal waveforms with time varying gains and summed generating a carrier phase modulation that is measured using a standard GPS carrier phase tracking loop to determine phase modulation amplitudes that are dependent on orientation of a satellite; and
   wherein said pointing vector is updated based on difference between a predicted carrier phase modulation and a measured carrier phase modulation resulting from the time varying gain used in the summation of the antenna signals.

2. The system of claim 1, further comprising a three axis gyroscope system configured to allow pointing determination while in motion.

3. The system of claim 1, wherein said pointing vector accuracy is measured based on comparison of said predicted carrier phase and said measured carrier phase.

4. The system of claim 1, wherein jamming and multipath is detected and mitigated based on comparison of said predicted carrier phase and said measured carrier phase with elimination of compromised satellite measurements from a solution.

5. The system of claim 1, wherein said pointing vector estimator is a Kalman estimator.

6. A method for determining the pointing direction of a system relative to an earth reference comprising:
   receiving transmission of a satellite by utilizing at least two stationary GPS antennas, wherein said antennas are separated from each other by a distance less than half a wavelength;
   scaling the output of said antennas by first and second sinusoidal waveforms with time varying gains and summing said scaled first and second sinusoidal waveforms;
   determining a pointing vector by utilizing a single GPS receiver having a pointing vector estimator configured to derive an optimum solution for pointing vector from said summed output of said at least two GPS antennas and known satellite geometries; and
   updating said pointing vector based on difference between a predicted carrier phase modulation and a measured carrier phase modulation resulting from the time varying gain used in the summation of the antenna signals.

7. The method of claim 6, further comprising determining said pointing vector while in motion by utilizing a three axis gyroscope system.

8. The method of claim 6, further comprising scaling with time varying gains and summing outputs of said antennas in order to generate a carrier phase modulation that is dependent on orientation of said satellite.

9. The method of claim 6, further comprising measuring of pointing accuracy based on comparison of said predicted carrier phase and said measured carrier phase.

10. The method of claim 6, further comprising detecting and mitigating jamming and multipath based on comparison of said predicted carrier phase and said measured carder phase with the elimination of compromised satellite measurements from a solution.

11. The method of claim 6, wherein said pointing vector estimator is a Kalman estimator.

12. A method for determining the pointing direction of a system relative to an earth reference comprising:
   receiving transmission of a satellite by utilizing at least two stationary GPS antennas, summing said transmission wherein said antennas are separated from each other by a distance less than half a wavelength;
   determining a pointing vector by utilizing a single GPS receiver from said summed transmission said single GPS receiver having a pointing vector estimator configured to derive an optimum solution for pointing vector from said summed transmission of said at least two GPS antennas and known satellite geometries;
   determining said pointing vector with said pointing vector estimator while in motion by utilizing a three axis gyroscope system; and
   scaling by first and second sinusoidal waveforms with time varying gains and summing outputs of said antennas in order to generate a carrier phase modulation that is dependent on, orientation of said satellite; and updating said pointing vector based on a difference between a predicted carrier phase modulation and a measured carrier phase modulation resulting from the time varying gain used in the summation of the antenna signals.

13. The method of claim 12, further comprising measuring of pointing accuracy based on comparison of said predicted carrier phase and said measured carrier phase.

14. The method of claim 12, further comprising detecting and mitigating Jamming and multipath based on comparison of said predicted carrier phase and said measured carrier phase with the elimination of compromised satellite measurements from a solution.

15. The method of claim 12, wherein said pointing vector estimator is a Kalman estimator.

\* \* \* \* \*